United States Patent [19]

Imase

[11] Patent Number: 5,683,323
[45] Date of Patent: Nov. 4, 1997

[54] BALL-ROLLING TYPE TORQUE TRANSMISSION DEVICE

[76] Inventor: Kenji Imase, 1166, Mitsukuri, Fujioka-cho, Nishikamo-gun, Aichi-ken, Japan

[21] Appl. No.: 678,768

[22] Filed: Jul. 11, 1996

[30] Foreign Application Priority Data

Jul. 11, 1995 [JP] Japan ................................ 7-175706

[51] Int. Cl.$^6$ .......................... F16H 13/06; F16H 1/28
[52] U.S. Cl. ................................................... 475/168
[58] Field of Search ................................. 475/165, 168, 475/180, 196

[56] References Cited

U.S. PATENT DOCUMENTS

| | | | |
|---|---|---|---|
| 4,643,047 | 2/1987 | Distin et al. | 475/168 |
| 4,829,851 | 5/1989 | Imase | 74/798 |
| 4,922,781 | 5/1990 | Peiji | 475/180 |
| 5,443,428 | 8/1995 | April et al. | 475/165 |

*Primary Examiner*—Dirk Wright
*Attorney, Agent, or Firm*—Sughrue, Mion, Zinn, Macpeak & Seas, PLLC

[57] ABSTRACT

In a ball-rolling type torque transmission device, an outer race groove an inner race groove are provided between the eccentric rotation disc and the input shaft, the output shaft or a first stationary member within the housing, the outer race groove being defined along a hypocycloidal curve having N+2 lobes, while the inner race groove defined along an epicycloidal curve having N lobes. Rollable balls are placed to position at N+1 points between the inner race groove and the outer race groove. A rectifying member is provided between the eccentric rotation disc and the input shaft, the output shaft or a second stationary member within the housing to rectify a movement of the eccentric rotation disc by cancelling an eccentric component of the eccentric rotation disc. A geometrical relationship between L1, L2, R1 and R2 being defined as follows: L1/L2=R1/R2 where L1 is a wavelength of one lobe of the outer race groove along which each of the balls rolls, L2 is a wavelength of one lobe of the inner race groove along which each of the balls rolls, R1 is a distance from a center of each of the balls to a first line formed by connecting points in which each of the balls inscribes the inner race groove, and R2 is a distance from a center of each of the balls to a second line formed by connecting points in which each of the balls inscribes the outer race groove.

8 Claims, 7 Drawing Sheets

Fig. 7a Prior Art points in which two curves E, H meet

Prior Art

Fig. 7b

BALL-ROLLING TYPE TORQUE TRANSMISSION DEVICE

BACKGROUND OF THE INVENTION

1. Field of the Invention

The invention relates to a ball-rolling type torque transmission device which is capable of reducing a thickness dimension with a relatively simple structure, and particularly insuring a smooth rotation with a high reduction ratio without sacrificing its entire compactness.

2. Description of the Prior Art

In modern robot technology accommodated into various types of machine tools, a speed reducer has been associated with an electric motor to reduce its speed for application to a transfer arm. Examples of presently known speed reducers are worm wheel reducers, cyclo reducers, and harmonic drive reducers.

However, it would be desirable to improve these types of speed reducers particularly in the following advantages:

That is, (i) a high reduction ratio with compact structure, (ii) a high controlling precision with minimum play of backlash, (iii) an elevated rigidity with high meshing rate, (iv) an easy controllability improved with a relatively small inertia force, (v) a minimum loss of torque with minimum wear.

A reducer device which satisfies these advantages (i)~(v) is shown in U.S. Pat. No. 4,829,851 which is patented on May 16, 1989 which is corresponding to Japanese Patent Application No. 141963/60 filed on Jun. 27, 1985. In the patent and patent application, are first and second discs provided each surface of which has a groove defined by a cycloidal-based curve. A plurality of balls are provided to roll along each groove of the first and second discs when a rotational movement is transmitted to the second disc so as to impart the second disc with a nutational movement. A rectifier disc picks up a rotational movement from the nutational movement of the second disc to produce a reduced output.

Figure 7A:
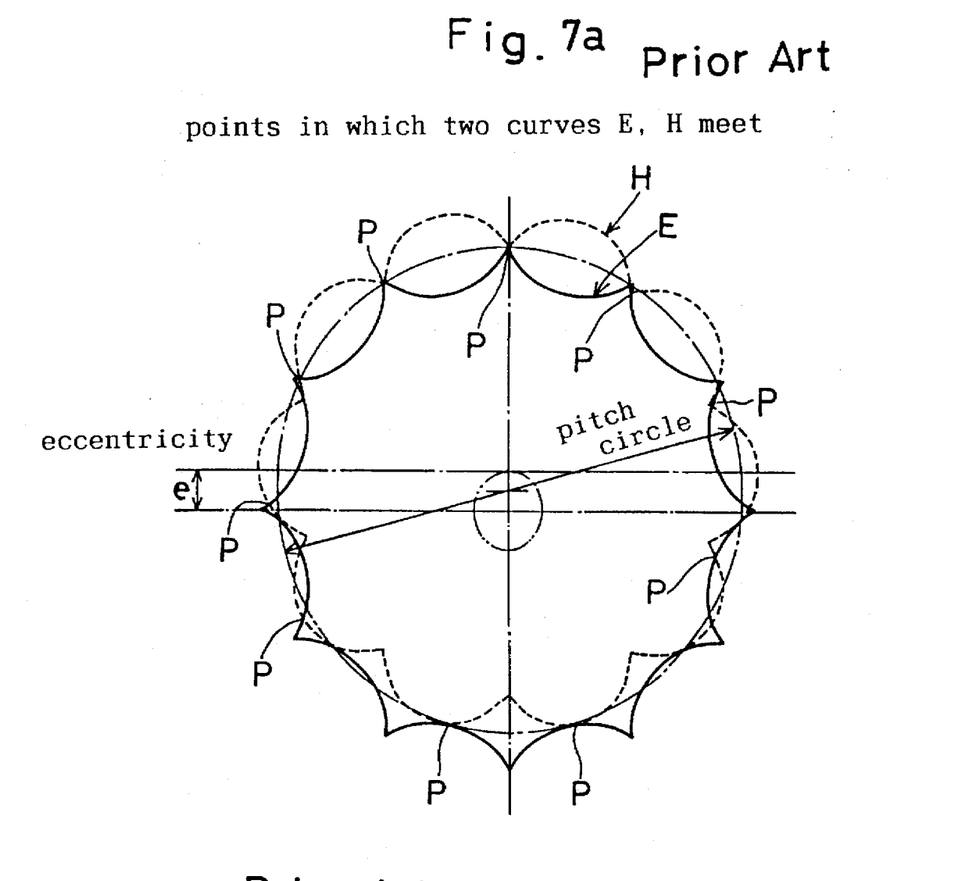
FIGS. 7a, 7b are schematic views of principle on which the transmission device is based in a prior art.
Figure 7B:
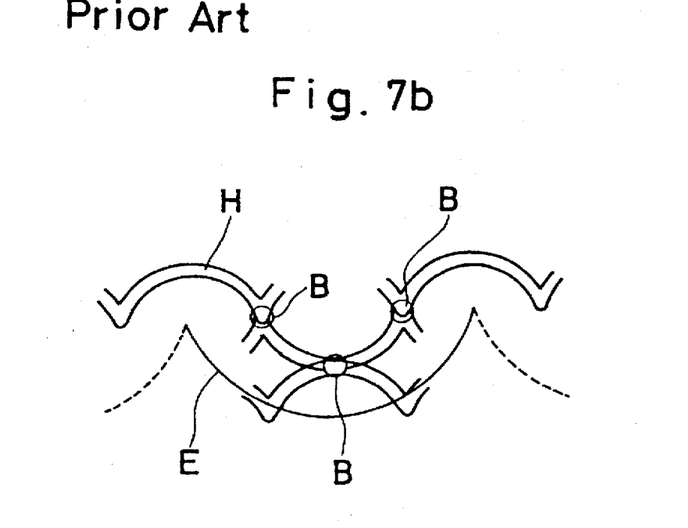

In the above devices, the torque transmission is based on the same principle as shown in FIGS. 7a, 7b. As shown in FIG. 7a, an inner groove E is provided along an epicycloidal curve having N lobes, and an outer groove H is provided along a hypocycloidal curve having N+2 lobes defined on the same plane of the inner groove E. Rollable balls B are placed at N+1 points P between the inner groove E and the outer groove H to reduce the transmission speed by N/2 or (N+2)/2 as shown in FIG. 7b.

In this transmission method, a smooth transmission is prohibited to render it difficult to put this type of speed reducer into a practical use. The smooth transmission is all the more prohibited when improving a machining precision of the inner and outer grooves while tightly assembling to eliminate a backlash between the balls and the two grooves. The invention is made on the basis on the discovery that the prohibition of the smooth transmission is because the balls slip by a difference between a lobe of the epicycloidal inner groove and that of the hypocycloidal outer groove.

Therefore, it is an object of the invention to provide a ball-rolling type torque transmission device which is capable of always preventing rollable balls from slipping so as to achieve a smooth rotation while rolling along the inner and outer grooves.

SUMMARY OF THE INVENTION

According to the invention, there is provided a ball-rolling type torque transmission device comprising: a housing having an input shaft and output shaft concentrically arranged therein, and having an eccentric shaft physically connected to the output shaft or the input shaft so as to rotate in unison therewith; an eccentric rotation disc rotatably disposed in the housing so as to be connected to the eccentric shaft; an outer race groove an inner race groove provided between the eccentric rotation disc and the input shaft, the output shaft or a first stationary member within the housing, the outer race groove being defined along a hypocycloidal curve having N+2 lobes, while the inner race groove defined along an epicycloidal curve having N lobes; rollable balls placed to position at N+1 points between the inner race groove and the outer race groove so as to form a transmission member with the stationary member and the eccentric rotation disc; a rectifying member provided between the eccentric rotation disc and the input shaft, the output shaft or a second stationary member within the housing to rectify a movement of the eccentric rotation disc by cancelling an eccentric component of the eccentric rotation disc; a geometrical relationship between L1, L2, R1 and R2 being defined as follows:

$$L1/L2 = R1/R2$$

where L1 is a wavelength of one lobe of the outer race groove along which each of the balls rolls, L2 is a wavelength of one lobe of the inner race groove along which each of the balls rolls, R1 is a distance from a center of each of the balls to a first line formed by connecting points in which each of the balls inscribes the inner race groove when rolling therealong, R2 is a distance from a center of each of the balls to a second line formed by connecting points in which each of the balls inscribes the outer race groove when rolling therealong.

With the geometrical relationship thus defined, an orbitual difference between the inner and outer race grooves is substantially is compensated by a positional difference between a first contact point in which the balls roll at R1 along the inner race groove and a second contact point in which the balls roll at R2 along the outer race groove.

According to one aspect of the invention, the eccentric shaft is in integral with the input shaft, and the inner race groove is provided on a periphery of the eccentric rotation disc, and the outer race groove is provided on an inner wall of the housing.

According to another aspect of the invention, the eccentric shaft is in integral with the input shaft, and the outer race groove is provided on the eccentric rotation disc, and the inner race groove is provided on a side of the output shaft.

According to still another aspect of the invention, the rollable balls are placed in position at N+1 points between the inner race groove and the outer race groove by means of a retainer.

According to other aspect of the invention, the inner race groove or the outer race groove is substantially V-shaped in section.

According to still other aspect of the invention, the wavelength L1, L2 and the distances R1, R2 are adjusted by altering a V-shaped angle of the inner race groove or the outer race groove.

According to other aspect of the invention, the inner race groove or the outer race groove is arcuate in section which has a curvature of radius greater than that of the rollable balls.

According to still another aspect of the invention, the wavelength L1, L2 and the distances R1, R2 are adjusted by altering a curvature of the inner race groove or the outer race groove.

The above and other objects, features and advantages of the present invention will be apparent from the following detailed description of the preferred embodiments of the invention in conjunction with the accompanying drawings, in which:

DETAILED DESCRIPTION OF PREFFERED EMBODIMENTS OF THE INVENTION

Figure 1:
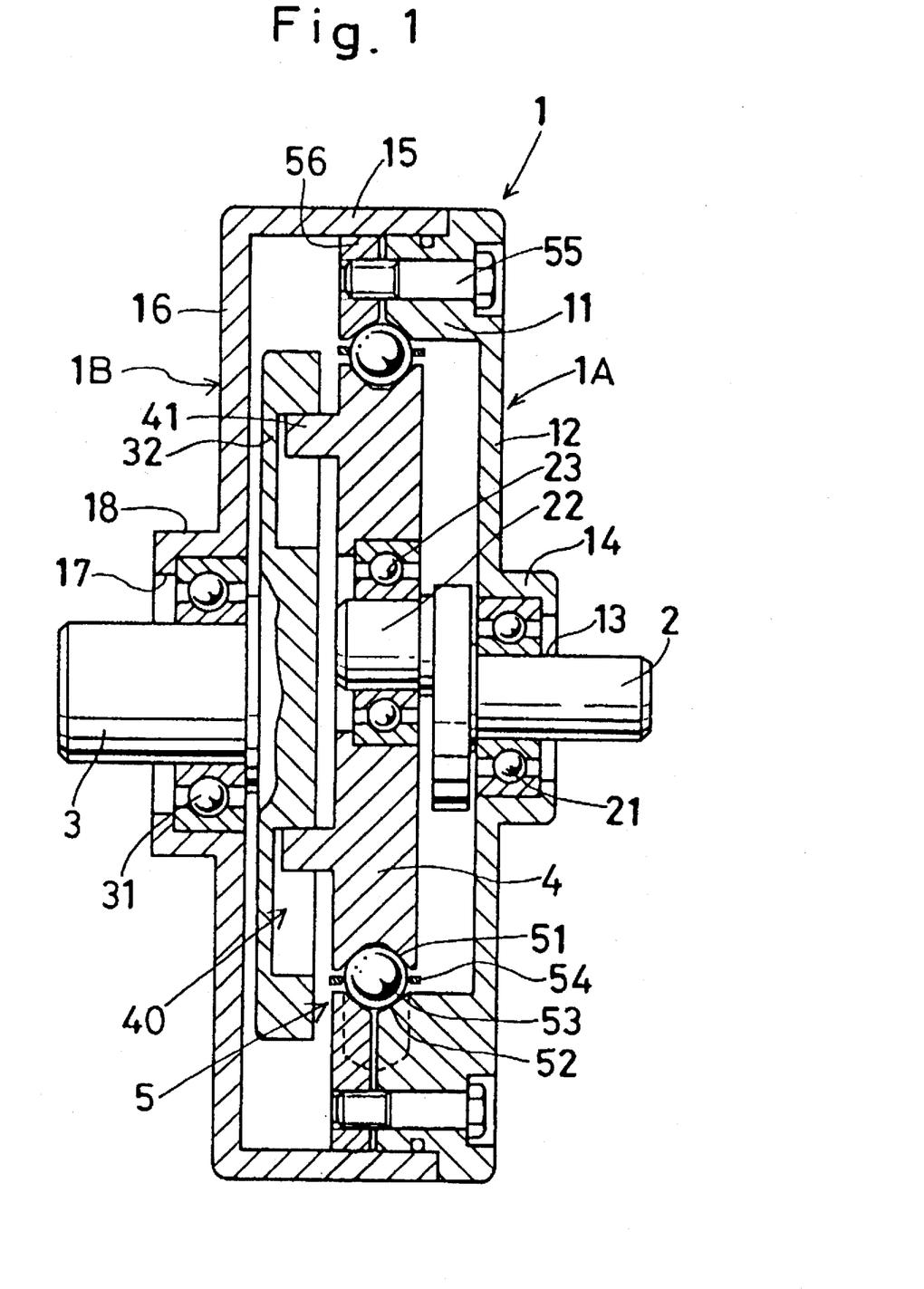
FIG. 1 is a longitudinal cross sectional view of a ball-rolling type torque transmission device according to an embodiment of the invention.
Figure 2:
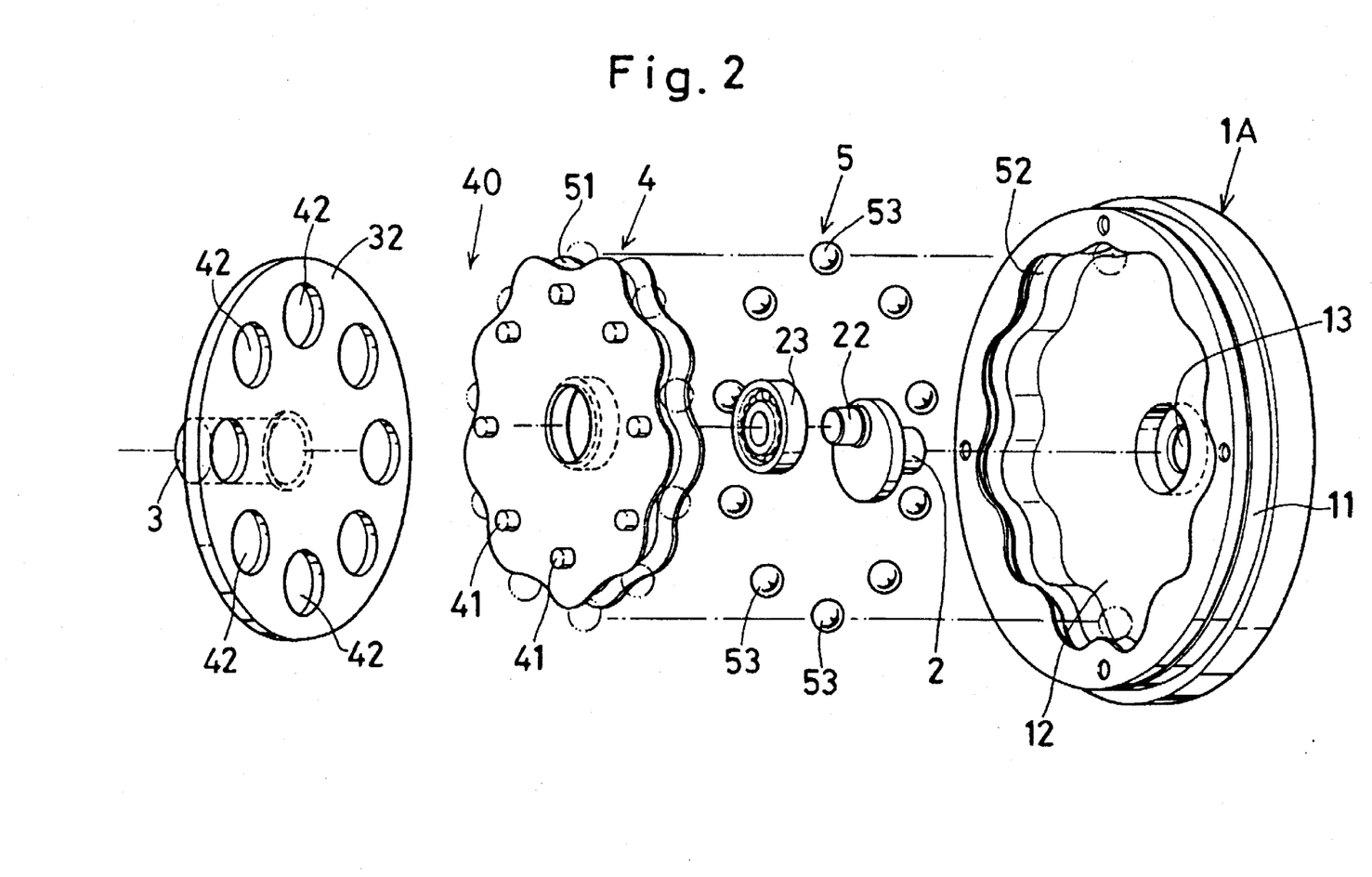
FIG. 2 is an exploded view of main members of the ball-rolling type torque transmission device.

Referring to FIGS. 1, 2 in which a ball-rolling type torque transmission device according to an embodiment of the invention a cylindrical housing 1 is provided by joining an input casing 1A and an output casing 1B together. The input casing 1A has an inner cylindrical portion 11, a right side wall 12 and a boss portion 14 which bulges rightward to form an axial bore 13. The output casing 1B has an outer cylindrical portion 15 into which the inner cylindrical portion 11 is telescoped, and the output casing 1B further having a left side wall 16 and a boss portion 18 which bulges leftward to form an axial bore 17.

At the boss portion 14, an input shaft 2 is rotatably supported by way of a bearing 21. At another boss portion 18, an output shaft 3 is provided in concentrical relationship with the input shaft 2, and rotatably supported by way of a bearing 31. To the input shaft 2, an eccentric shaft 22 is integrally connected within the housing 1 so as to rotate in unison. To the eccentric shaft 22, an eccentric rotation disc 4 is rotatably connected by way of a bearing 23.

The input shaft 3 integrally has an intermediate disc 32 disposed within the housing 1. Between the intermediate disc 32 and the eccentric rotation disc 4, a rectifying member 40 is provided to rectify a movement of the eccentric rotation disc 4 by cancelling an eccentric component of the eccentric rotation disc 4.

In the rectifying member 40, a plurality of studs 41 is provided on a left surface of the eccentric rotation disc 4 at regular intervals along a predetermined pitch circle. Circular cavities 42 are provided on a right surface of the intermediate disc 32 in correspondence to the studs 41 so that each of the studs 41 can slides along an inner wall of the corresponding cavities 42.

It is noted that the number of studs 41 is not limited to eight, but the number of studs and its dimension are appropriately selected at discretion according to the required torque and revolution of the transmission device. Instead of the studs 41 of the rectifying member 40, semi-spherical cavities may be used, and annular grooves of semi-circular in section may be used instead of the circular cavities 42 so that spherical balls can freely roll along the semi-spherical cavities and the annular grooves. Further, the rectifying member 40 may be Oldham's coupling.

Between an outer periphery of the eccentric rotation disc 4 and the inner cylindrical portion 11 of the input casing 1A, a transmission member 5 is provided. The transmission member 5 has an inner race groove 51, outer race groove 52 and rollable balls 53 placed between the two grooves 51, 52. The inner race groove 51 is defined on the outer periphery of the eccentric rotation disc 4 along an epicycloidal curve. The outer race groove 52 is placed in the same plane of the inner race groove 51, and defined on an inner wall of the inner cylindrical portion 11 along a hypocycloidal curve. The rollable balls 53 are located at points in which the epicycloidal curve the inner race groove 51 meets the hypocycloidal curve of the outer race groove 52.

Figure 3A:
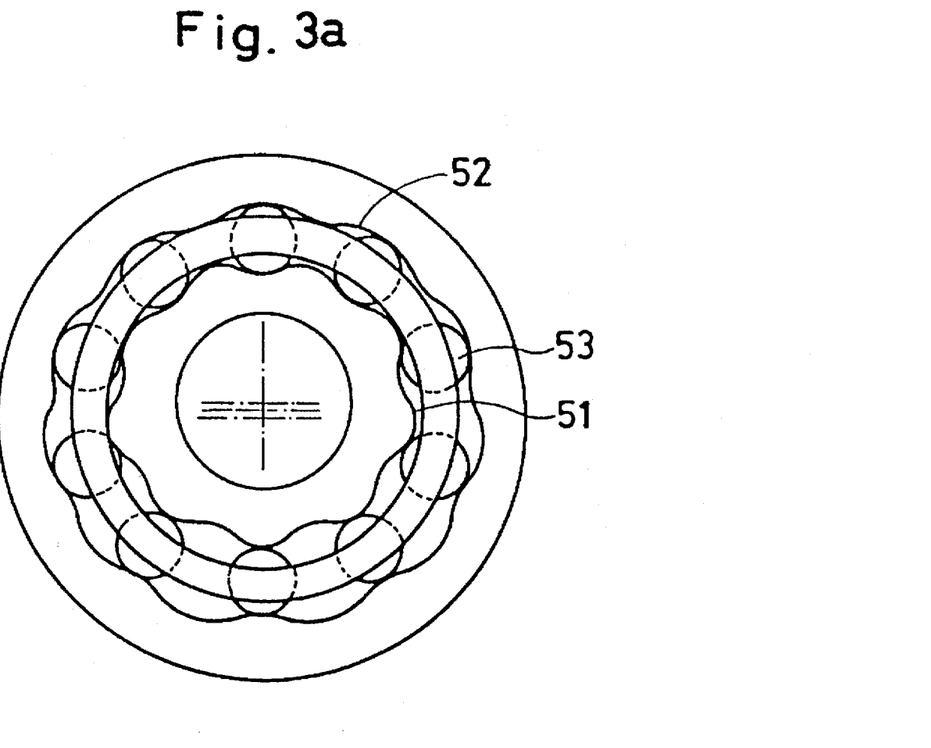
FIGS. 3a, 3b are enlarged views showing how the balls roll along an inner race groove and outer race groove.

The balls 53 rolls along the epicycloidal and hypocycloidal curves of the inner and outer race grooves 51, 52 as shown in FIG. 3a. The balls 53 are placed in position by means of a retainer 54, but it is possible to obviate the necessity of the retainer by increasing depths of the inner and outer race grooves 51, 52 while using diameter-increased balls.

By way of illustration, the inner race groove is defined along the hypocycloidal curve having N (e.g. 9) lobes, while the outer race groove defined along the epicycloidal curve having N+2 (e.g. 11) lobes. The rollable balls 53 are placed to position at N+1 (e.g. 10) points between the inner race groove 51 and the outer race groove 52, and thereby achieving N/2 reduction ratio between the input shaft 2 and the output shaft 3.

The inner and outer race grooves 51, 52 are substantially V-shaped in section along which the balls 53 rolls while keeping contact therewith. Each center of the balls is located at the nodal points in which the epicycloidal curve meets the hypocycloidal curve. For this reason, it is possible to obtain a distance R from each center of the balls 53 to a parallel plane formed connecting two points in which each of the balls inscribes the inner race groove 51 (52) when rolling along the groove 51 (52).

Figure 3B:
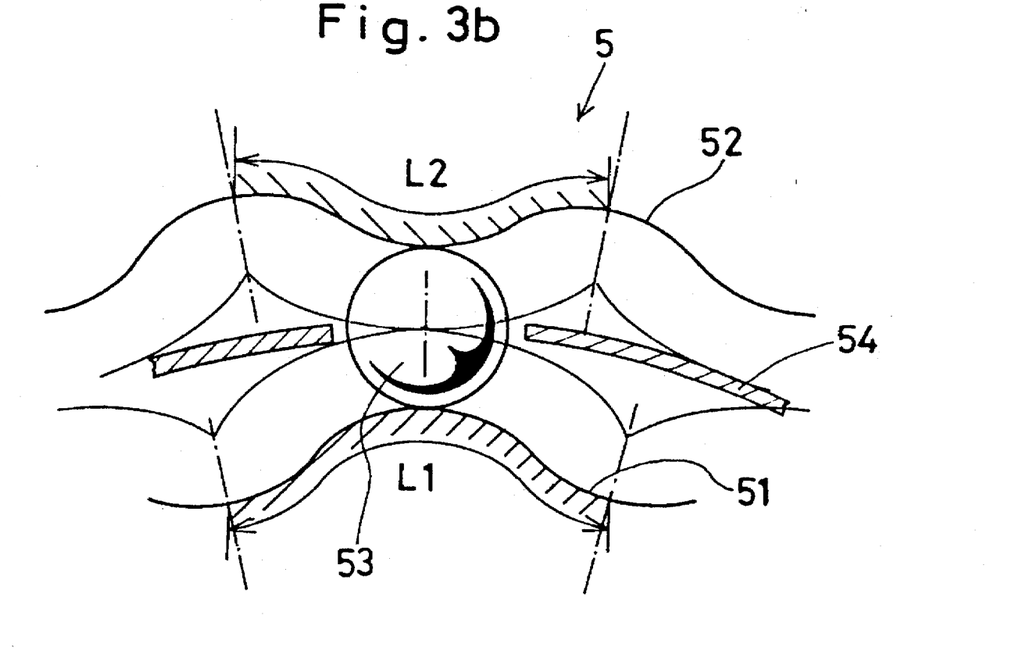

In general, formula L1>L2 is usually obtained where L1 is a wavelength of one lobe of the inner race groove 51 along which each of the balls 53 rolls, and L2 is a wavelength of one lobe of the outer race groove 52 along which each of the balls 53 rolls as shown in FIG. 3b. The wavelengths L1 and L2 are L/N and L/(N+2) in turn because the number of the lobes of the grooves 51 and 52 are N and N+2 respectively, where L is circumferential length of the inner and outer race grooves 51, 52 which have the same length mutually.

In order to obviate a slipping movement of the balls 53, it is imperative for the balls 53 to roll the same turns at R1 and R2 until the balls 53 finish to travel the lobe lengths L1 and L2 of the inner and outer race grooves 51, 52. That is to say, the expression $L1/2\pi R1 = L2/2\pi R2$ must be satisfied.

With the expression in mind, a geometrical relationship between L1, L2, R1 and R2 is defined as follows:

$L1/L2 = R1/R2$

R1 is a distance from a center C of each of the balls 53 to a parallel line T1 formed by connecting the points in which each of the balls inscribes the inner race groove 51 when rolling therealong, R2 is a distance from a center of each of the balls 53 to a parallel line T2 formed by connecting the points in which each of the balls inscribes the outer race groove 52 when rolling therealong.

It is to be observed that the geometrical relationship may be L1/L2≅R1/R2.

With the geometrical relationship determined above, the balls 53 substantially travel the different lengths L1 and L2 the same turns at R1 and R2 when finished to roll along one lobe of the inner and outer race grooves 51, 52, and thereby preventing the balls 53 from slipping between the inner and outer race grooves 51, 52. This makes it possible to positively roll the balls 53 along the inner and outer race grooves 51, 52, thus insuring a smooth rotation so as to effect a swift transmission.

It is noted that the V-shaped groove is provided by securely joining an annular ring 56 to an open end of the inner cylindrical portion 11 by means of a bolt 55. This is to facilitate an assemble of the transmission member 5.

Figure 4A:
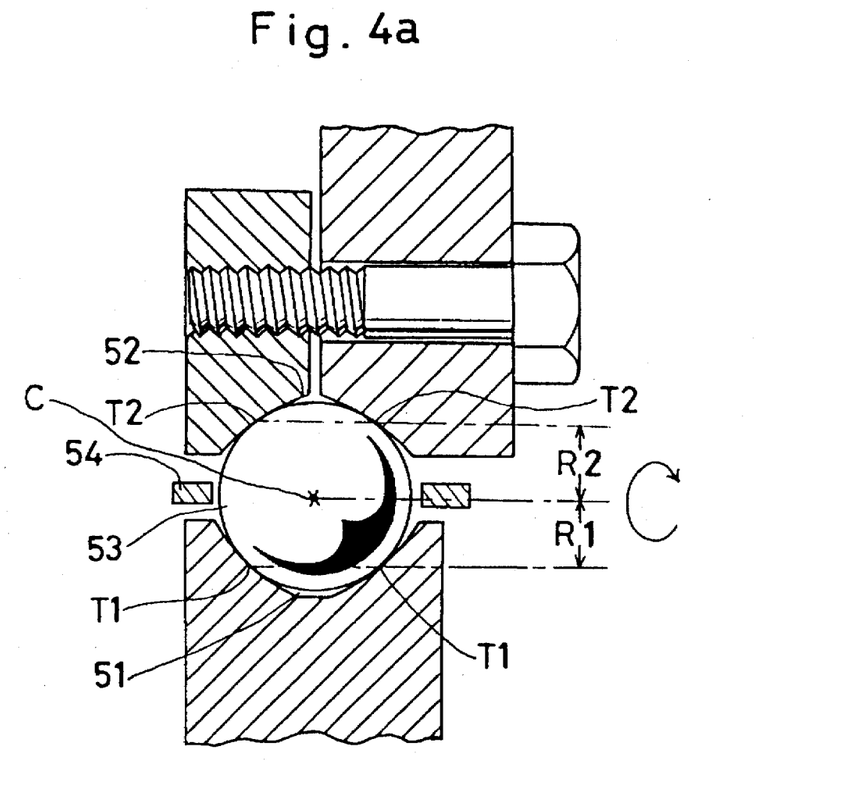
FIGS. 4a, 4b are enlarged views showing how the balls are in contact with the inner and outer race grooves when rolling therealong.
Figure 5A:
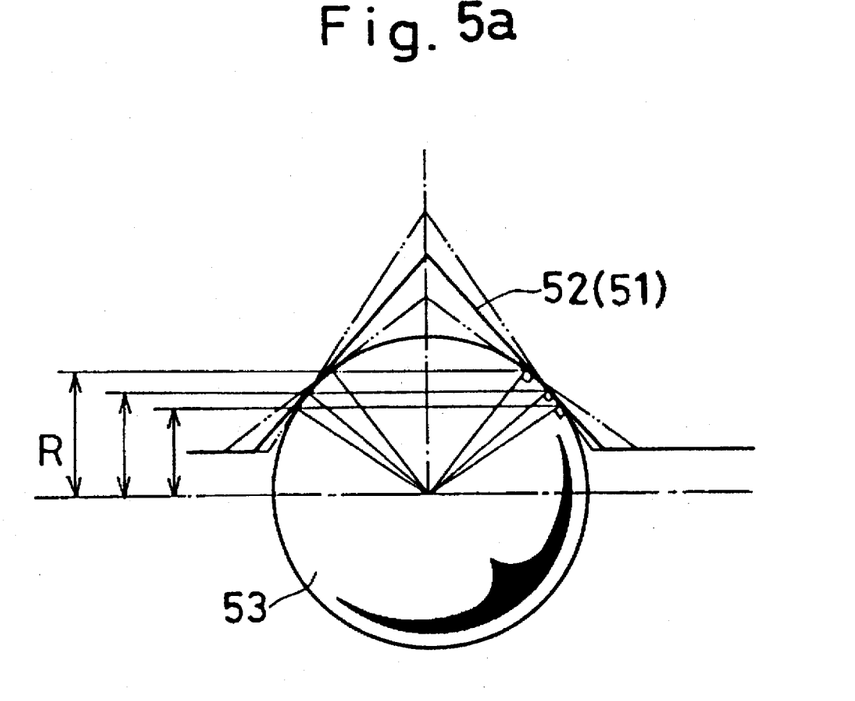
FIGS. 5a, 5b are enlarged views showing that the inner and outer race grooves are V-shaped in section.

Upon adjusting the distances R1, R2, it is possible to alter a V-shaped angle of the inner and outer race grooves 51, 52 as shown in FIG. 5a. As shown in FIG. 4a, it is preferable to determine a radius of curvature of the V-shaped groove greater than that of the balls 53 when taking wear-resistance and service life into consideration. In this instance; the V-shaped walls of the inner and outer race grooves 51, 52 are slightly arcuated to impart the curvature with the V-shaped walls.

Figure 5B:
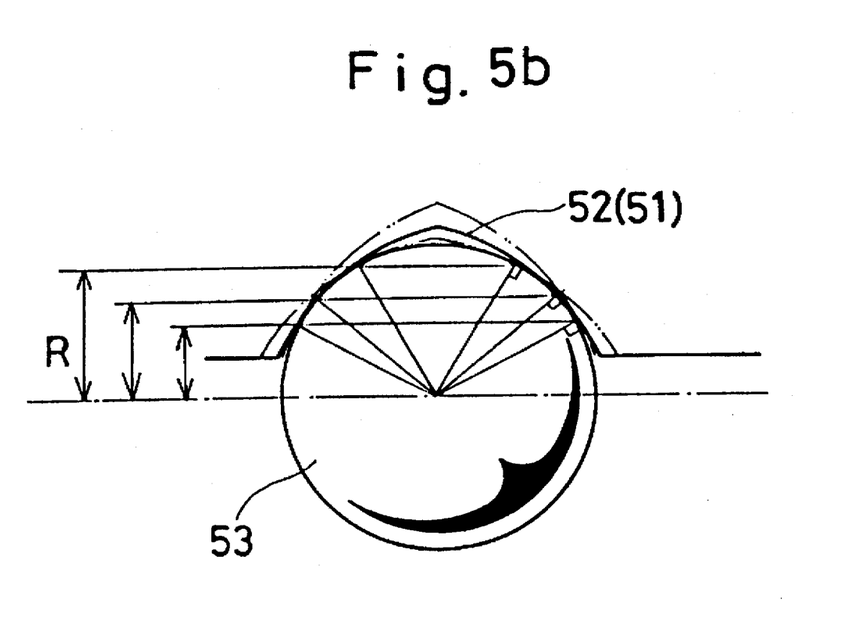

The adjustment of the distances R1, R2 is carried out by altering curvatures of the inner and outer race grooves 51, 52 as shown in FIG. 5b. It is also possible to adjust the distances R1, R2 by altering the V-shaped angle of the inner race groove 51 and modifying the curvature of the outer race groove 52 concurrently.

Figure 4B:
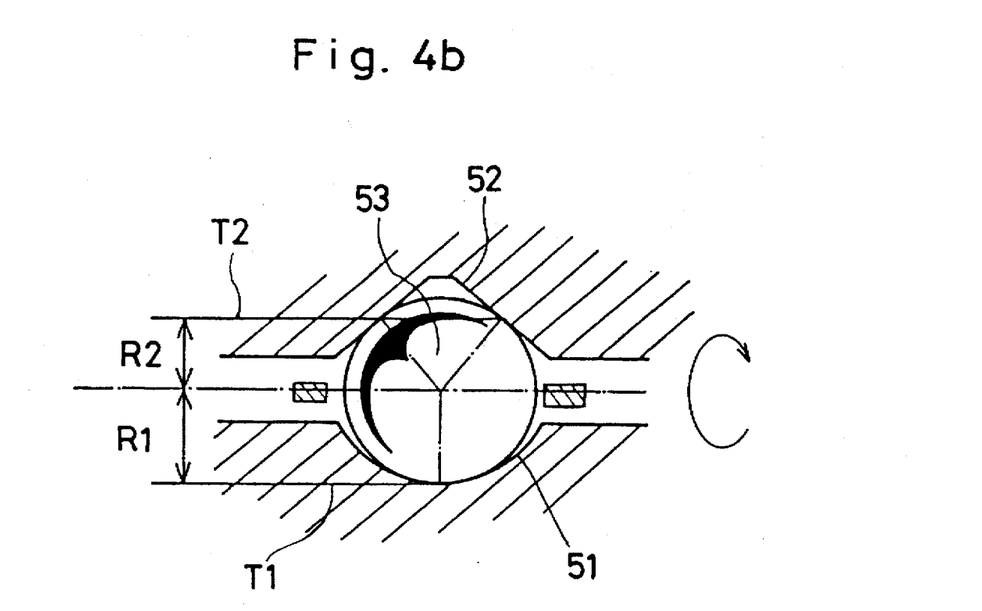

As shown in FIG. 4b, the inner race groove 51 is arcuate in section whose radius of curvature is somewhat greater than that of the rollable balls 53 so as to make contact the balls 53 with the inner race groove 51 at one point in which the balls 53 inscribes the inner race groove 51. In this instance, the distance R1 is equivalent to the radius of the rollable balls 53.

Figure 6:
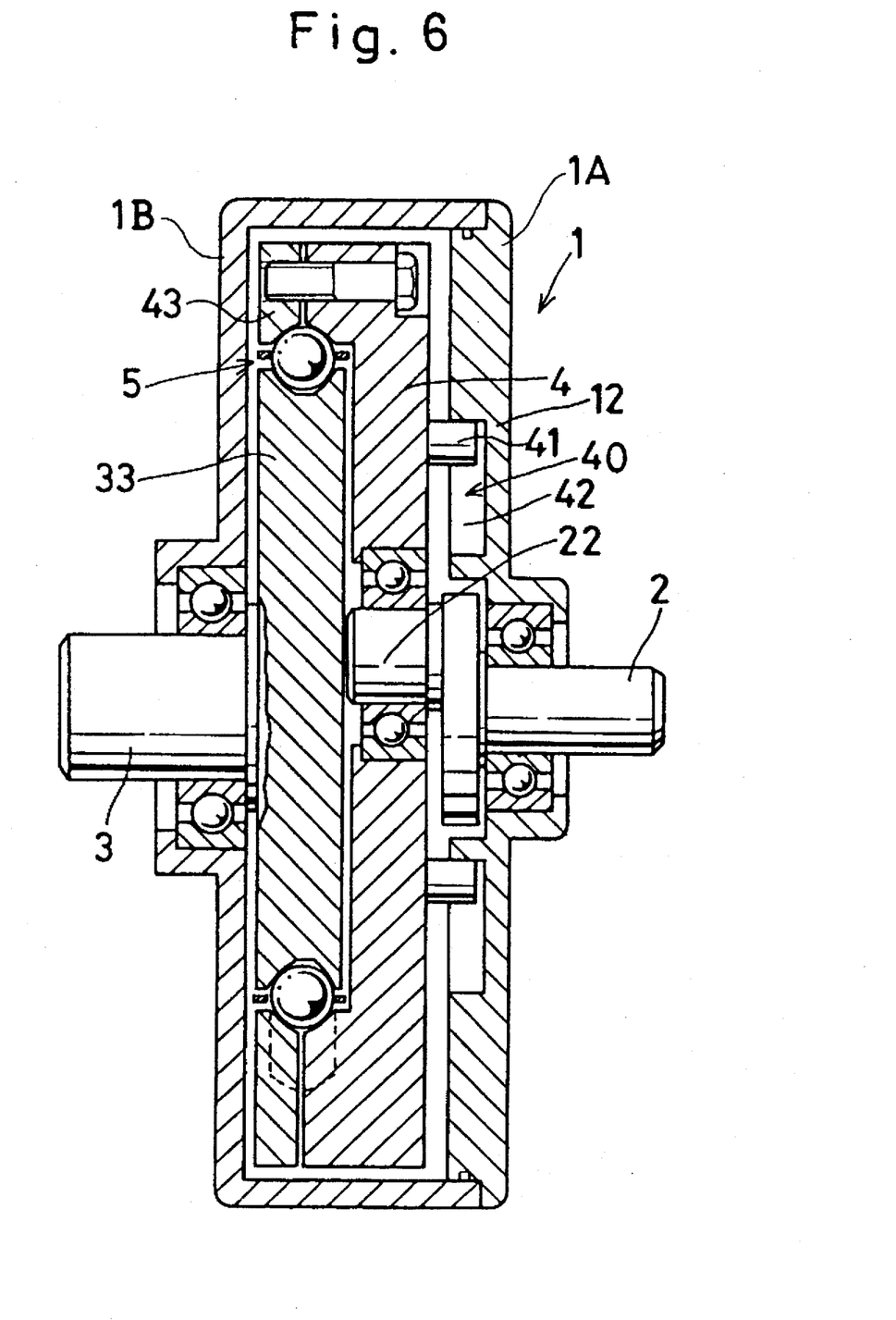
FIG. 6 is a longitudinal cross sectional view of a ball-rolling type torque transmission device according to another embodiment of the invention.

FIG. 6 shows another embodiment of the invention in which an inner cylindrical portion 43 is provided on a left surface of the eccentric rotation disc 4. Between an inner wall of the inner cylindrical portion 43 and an outer periphery of an intermediate disc 33 integrally connected to the output shaft 3 so as to form the transmission member 5. The rectifying member 40 is provided between the right side wall 12 of the input casing 1A and a right surface of the eccentric rotation disc 4. With the structure thus attained, it is possible to insure the same advantages as obtained from the preceding embodiment of the invention.

It is appreciated that the rollable balls 53 may be made of wear-resistant material such as steel or sintered ceramic powder with aluminum nitride as a main ingredient.

It is also noted that the case hardening treatment may be added at the inner and outer race grooves 51, 52 along which the balls roll at the time of torque transmission.

While the invention has been described with reference to the specific embodiments, it is understood that this description is not to be construed in a limiting sense in as much as various modifications and additions to the specific embodiments may be made by skilled artisans without departing from the spirit and scope of the invention.

What is claimed is:

1. A ball-rolling type torque transmission device comprising:

a housing having an input shaft and output shaft concentrically arranged therein, and having an eccentric shaft physically connected to the output shaft or the input shaft so as to rotate in unison therewith;

an eccentric rotation disc rotatably disposed in the housing so as to be connected to the eccentric shaft;

an outer race groove an inner race groove provided between the eccentric rotation disc and the input shaft, the output shaft or a first stationary member within the housing, the outer race groove being defined along a hypocycloidal curve having N+2 lobes, while the inner race groove defined along an epicycloidal curve having N lobes;

rollable balls placed to position at N+1 points between the inner race groove and the outer race groove so as to form a transmission member with the stationary member and the eccentric rotation disc;

a rectifying member provided between the eccentric rotation disc and the input shaft, the output shaft or a second stationary member within the housing to rectify a movement of the eccentric rotation disc by cancelling an eccentric component of the eccentric rotation disc;

a geometrical relationship between L1, L2, R1 and R2 being defined as follows:

L1/L2=R1/R2 where L1 is a wavelength of one lobe of the outer race groove along which each of the balls rolls, L2 is a wavelength of one lobe of the inner race groove along which each of the balls rolls, R1 is a distance from a center of each of the balls to a first line formed by connecting points in which each of the balls inscribes the inner race groove when rolling therealong, R2 is a distance from a center of each of the balls to a second line formed by connecting points in which each of the balls inscribes the outer race groove when rolling therealong.

2. A ball-rolling type torque transmission device as recited in claim 1, wherein the eccentric shaft is in integral with the input shaft, and the inner race groove is provided on a periphery of the eccentric rotation disc, and the outer race groove is provided on an inner wall of the housing.

3. A ball-rolling type torque transmission device as recited in claim 1, wherein the eccentric shaft is in integral with the input shaft, and the outer race groove is provided on the eccentric rotation disc, and the inner race groove is provided on a side of the output shaft.

4. A ball-rolling type torque transmission device as recited in any one of claims 1~3, wherein the rollable balls are placed in position at N+1 points between the inner race groove and the outer race groove by means of a retainer.

5. A ball-rolling type torque transmission device as recited in any one of claims 1~3, wherein the inner race groove or the outer race groove is substantially V-shaped in section.

6. A ball-rolling type torque transmission device as recited in claim 5, wherein the wavelength L1, L2 and the distances R1, R2 are adjusted by altering a V-shaped angle of the inner race groove or the outer race groove.

7. A ball-rolling type torque transmission device as recited in any one of claims 1~3, wherein the inner race groove or the outer race groove is arcuate in section which has a curvature of radius greater than that of the rollable balls.

8. A ball-rolling type torque transmission device as recited in claim 7, wherein the wavelength L1, L2 and the distances R1, R2 are, adjusted by altering a curvature of the inner race groove or the outer race groove.

* * * * *